United States Patent
Burger et al.

(10) Patent No.: US 8,533,216 B2
(45) Date of Patent: Sep. 10, 2013

(54) DATABASE SYSTEM WORKLOAD MANAGEMENT METHOD AND SYSTEM

(75) Inventors: Louis Burger, Escondido, CA (US); Thomas Julien, San Diego, CA (US); Frank Roderic Vandervort, Ramona, CA (US)

(73) Assignee: Teradata US, Inc., Dayton, OH (US)

( * ) Notice: Subject to any disclaimer, the term of this patent is extended or adjusted under 35 U.S.C. 154(b) by 1567 days.

(21) Appl. No.: 11/554,113

(22) Filed: Oct. 30, 2006

(65) Prior Publication Data

US 2008/0104015 A1    May 1, 2008

(51) Int. Cl.
*G06F 17/30* (2006.01)
(52) U.S. Cl.
USPC .......................................... 707/769; 707/770
(58) Field of Classification Search
USPC .......... 707/2–4, 9, 100, 102, 103 R, 759–780
See application file for complete search history.

(56) References Cited

U.S. PATENT DOCUMENTS 7,069,264 B2 * 6/2006 Anjur et al. ...................... 707/4

* cited by examiner

*Primary Examiner* — Wilson Lee
(74) *Attorney, Agent, or Firm* — Steve McDonald

(57) ABSTRACT

An improved workload management system and method for a database system. The improved workload management system evaluates certain workload management rules dynamically at key points during database query execution rather than relying on enforcement prior to query activation. In the case of product join operations, the workload management system evaluates the potential impact on system performance by the product join operation after input tables have been populated, but prior to the execution of the join operation. Delaying workload management enforcement to this point ensures that the sizes of inputs and outputs are reliably known and improves system performance impact estimates at a point early enough to prevent any serious performance degradation from an inefficient product join.

17 Claims, 2 Drawing Sheets

DATABASE SYSTEM WORKLOAD MANAGEMENT METHOD AND SYSTEM

FIELD OF THE INVENTION

The present invention relates to managing the workload of a database system and in particular managing the workload resulting from a query requiring a product join.

BACKGROUND

Relational database systems store tables of data which are typically linked together by relationships that simplify the storage of data and make queries of the data more efficient. Structured Query Language (SQL) is a standardized language for creating and operating on relational databases.

Relational database systems typically include an optimizer that plans the execution of SQL queries.

Many commercial database products, including Teradata™, offer workload management features that can reject (or delay) SQL queries based on an estimated impact on system performance of the query. Database administrators can define rules and criteria that identify resource expensive or inefficient queries that can be applied prior to query execution. Such rules are often defined as limits on the type of operations that can be performed, given the queries estimated resource usage. One example is the use of rules that identify and control the execution of "product joins", which by their very nature can be resource intensive if there is a large number of rows to be joined. To control product joins, database administrators will typically impose a limit on the estimated number of input rows or the estimated number of results in output rows. Queries with product join operations that exceed a defined criteria are either rejected entirely or delayed for execution at a less critical time.

A major limitation of workload management rules is that they are normally enforced prior to query execution and hence must rely exclusively on estimated sizes and costs from the query optimizer. In many cases, these estimates can be inaccurate, which in turn, can result in a defined rule not being properly enforced. In the specific case of product joins, such mistakes can result in the execution of a query that negatively impacts on overall system performance and other users of the system. Conversely, such mistakes can result in the rejection or the delaying of an efficient query whose execution would not have a significant negative impact on the system.

SUMMARY OF THE PRESENT INVENTION

According to one aspect of the present invention, there is a database system workload management method comprising:
 providing populated input tables of a database query;
 calculating one or more parameters reflective of resource requirements of the query, wherein the resource requirements of the query are based on the populated input tables;
 determining whether the one or more of the parameters exceed a respective specified parameter maximum value; and
 in the event that the one or more parameters do not exceed the respective maximum value proceeding with execution of the query.

In an embodiment the query involves a product join.

In an embodiment, in the event that the one or more input parameters exceed the respective maximum value, execution of the query is stopped or delayed.

In an embodiment, the one or more parameters are derived from the number of rows of the input tables.

In an embodiment, one or more of the input tables is a spool file, in which the number of rows is obtained from a count recorded by the population of the spool file.

In an embodiment, one or more of the input tables is a base table.

In an embodiment, one of the number of rows of the input tables is obtained from an optimizer's estimate in an execution plan.

In an embodiment, one of the parameters is a cross product of the number of rows of each input table.

In an embodiment, one of the parameters is a number of output rows. In an embodiment, the number of output rows is determined by the actual number of input rows. In an embodiment, the number of output rows is an estimate by the optimizer.

In an embodiment, one of the parameters is an output size of a table resulting from the query. In an embodiment the output size is determined by the actual size of the output table. In another embodiment the output size is an estimate.

In an embodiment the parameter is partly based on the actual size of the input table.

According to another aspect of the present invention, there is a database system for performing a query based on populated input tables comprising:
 a calculator for calculating one or more parameters reflective of resource requirements of the query, wherein the resource requirements of the query are based on the populated input tables;
 a comparator for determining whether the one or more of the parameters exceed a respective specified parameter maximum value; and in the event that the one or more parameters do not exceed the respective maximum value the comparator is arranged to cause execution of the query to proceed.

According to a further aspect of the present invention, there is a database product computer program comprising instructions for causing a computer processor to:
 calculate one or more parameters reflective of resource requirements of a database query, wherein the resource requirements of the query are based on populated input tables of the database query;
 determine whether the one or more of the parameters exceed a respective specified parameter maximum value; and
 proceed with execution of the query in the event that the one or more parameters do not exceed the respective maximum value.

DESCRIPTION OF THE DRAWINGS

Referring to FIG. 1, a schematic representation of a database system 10 is shown, which includes a processor 12, a source of instructions 14, a database 16 and I/O 18. The source of instructions 14 and the database 16 may be stored in the same or separate storage devices, which may include random access memory, hard disk drive(s) or some other suitable storage means. These storage devices may be local or may be located over a network. The processor 12 may be a single processing unit or a plurality of processing units. The I/O 18 typically includes human input devices and/or one or more displays and may also include a network interface.

The processor 12 operated under the control of at least one database product computer program to as to implement the database system 10. The computer program is stored on a computer readable medium, such as a diskette, compact disk or digital versatile disk, and is loaded onto the computer's storage device so as to execute when called.

Instructions in the form of SQL statements are provided from the instruction source 14 to the processor 12 and are used by the processor 12 to create and store the database 16 and/or modify the database 16 and/or retrieve information from the database 16 all under the control of the database product computer program. Data may be entered via the I/O 18 or maybe provided as an output by I/O 18.

Query processing architecture in most relational database systems includes a parsing system to compile and optimize the SQL request into a series of execution steps that represent internal database operations, such as file retrievals, index usage, sorting, join operations, etc. A separate dispatcher component then issues these steps to a run-time sub-system for execution and co-ordinates their compilation. Because queries are executed as a series of well defined steps by a central coordinator, it is possible to enforce workload management tools at key points of the execution.

Figure 1:
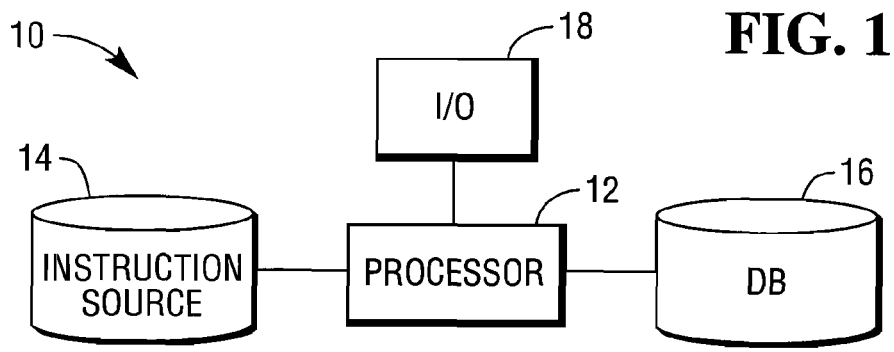
FIG. 1 is schematic block diagram of a database system.
Figure 2:
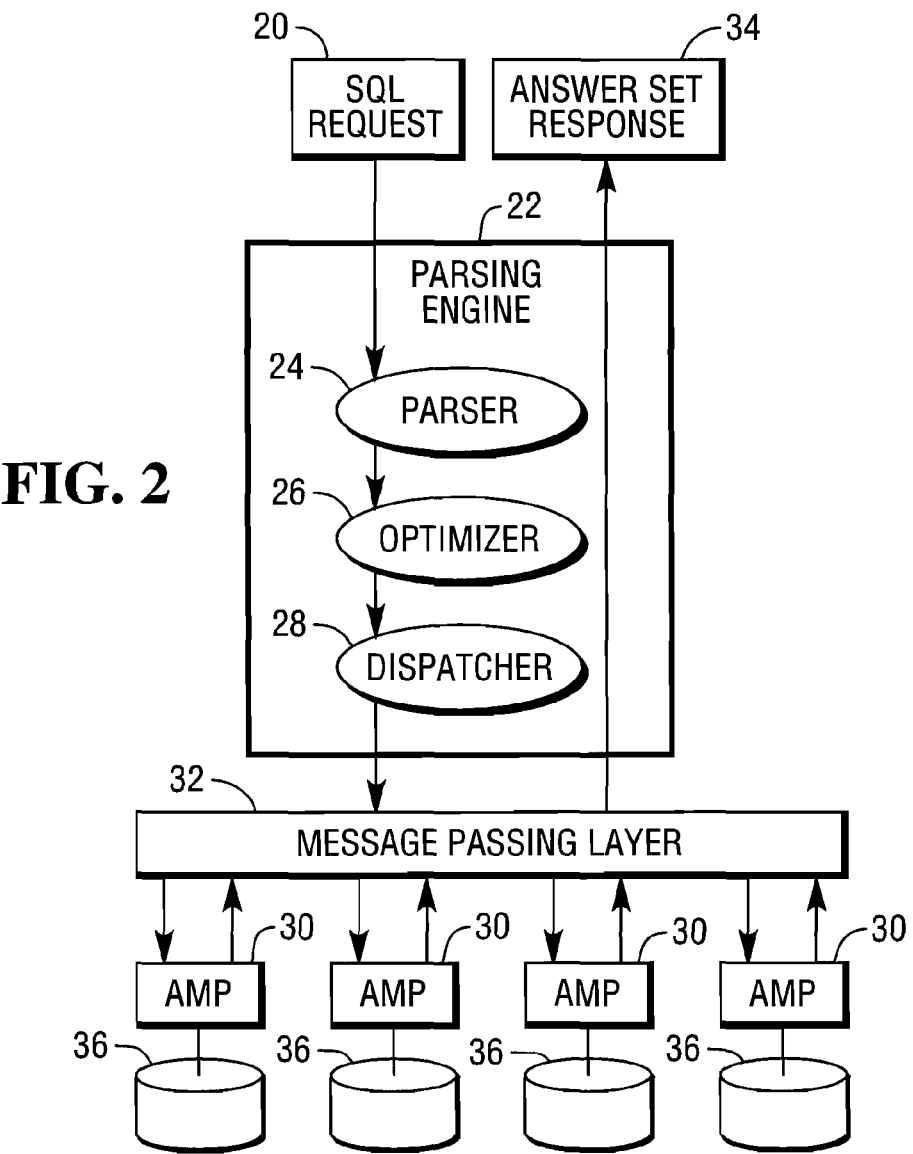
FIG. 2 is schematic block diagram showing information passing between elements of a database system implementing architectural parallelism.

FIG. 2 shows an implementation a database system query processing architecture with parallelism. In this implementation, SQL statements and in particular a SQL Request statement 20 is a passed to a parsing system in the form of parsing engine 22. The parsing engine 22 includes a parser 24, an optimizer 26 and a dispatcher 28. The optimizer 26 produced an optimized plan of execution of the SQL Request 20. The dispatcher 28 dispatches the optimized plan to one of a plurality of assess module processors (AMPs) 30 via a message passing layer 32. Each AMP 30 manages and retrieves data from the database 16 stored in a respective storage device 36. In particular, each AMP 30 finds the rows of a requested table according to the SQL Request 20, sorts rows, aggregates columns, provides output conversion and formatting, and manages disk space.

The retrieved information is passed via the message passing layer 32 to the parsing engine 22 and is provided as an answer set response 34 to a client that sent the SQL Request 20.

A "product join" is a general case algorithm that operates on tables of the database and is capable of performing any join operation including non-equi joins (for example, SELECT * FROM table1, table2 WHERE table1.col<table2.col) and Cartesian products (for example, SELECT * FROM table1, table2). The internal algorithm for product joins performs a comparison between every qualifying row in the first (left) table with every qualifying row in the second (right) table. Hence the total number of comparisons is equal to the product of the number of qualifying rows in the two input tables. The process of performing these comparisons requires disk I/O cost to scan the qualifying rows and a CPU cost to evaluate the comparison condition. The number of input rows resulting from a product join is dependant on the number of input rows and the selectivity of the applied join condition (if any). The process of writing the output rows to a spool file incurs additional CPU and disk I/O costs as well as disk space to store the rows. The required resources (CPU, disk I/O and disk space) for a product join are thus heavily dependant on the actual number of input and output rows.

A product join is normally chosen by the query optimizer when the semantics of the SQL query require it (for example non-equi joins or cartesian products). However in certain cases it may also be chosen over other available join algorithms. This normally occurs when the optimizer's estimated size for one of the two input tables is very small.

The majority of complex queries are executed in multiple steps where intermediate results must be passed from one step to another. The most common mechanism for doing this is the use of temporary "spool" files to store intermediate results. The input tables for a given product join operation will either be in the form of a permanent user based table or a temporary spool file that was populated by a prior execution step. Where a spool file is populated, a running tally of the number of rows inserted is kept and the final count is included as part of the completion information sent back to the dispatcher. In the case of the user based tables, the optimizer will usually have an accurate estimate included in its generated plan where the estimate is based on either collected statistics or random sampling.

Figure 3:
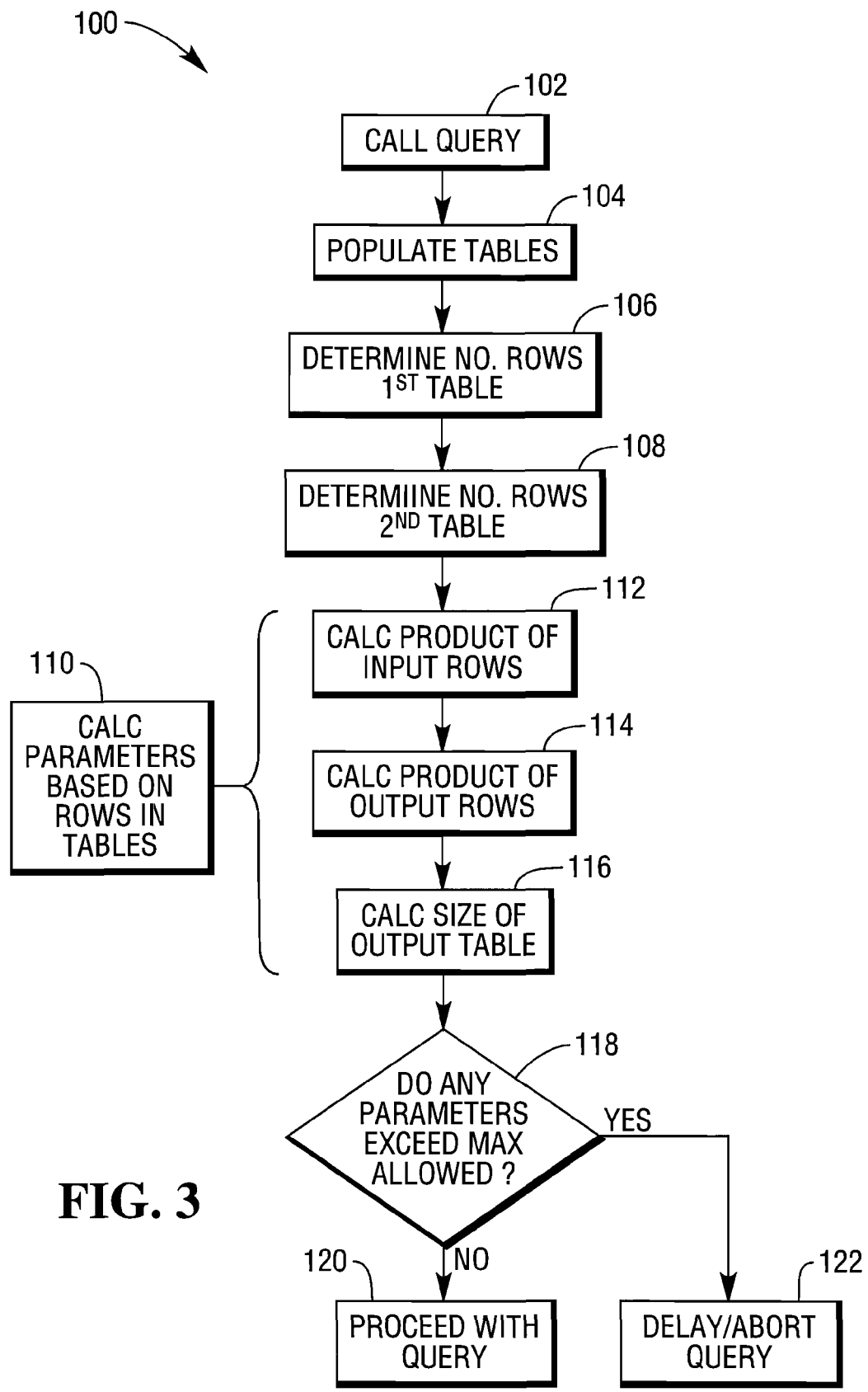
FIG. 3 is a flow chart of one embodiment of a method of database workload management according to the present invention.

Referring to FIG. 3, which shows one embodiment of the present invention as a method of database system workload management 100. This method 100 is performed by the database product computer program. The method 100 commences when a query is called at 102 that requires database system workload management, such as where a product join is required. Input tables to the product join are populated at 104. This would typically involve populating spool files and it also includes retrieving prior populated base tables.

The next step at 106 involves determining the number of rows in a first table. At 108 the number of rows in the second table is determined.

At 110 parameters based on the number of rows in the tables are calculated, these parameters are reflective of the resource requirements of the query. In particular, three examples of the parameters are provided. At 112 the product of the input rows is calculated. At 114 the size of the output rows is calculated. At 116 the number of output rows is calculated and then the size of the output table is calculated from the number of output rows and the size of the output rows.

The parameters are then compared to define to respective defined maximum values allowed at 118. Thus, for example, the cross product of the number of input rows is compared to a respective maximum, the size of the output rows is compared to a respective maximum allowed value and the size of the output table is compared to a respective maximum value. It is then determined whether any of these parameters exceed the maximum allowed value.

The number of input rows to the product join is calculated in order to avoid excessive CPU usage and excessive disk I/O reads during execution of the product join. The number of output row and the output row size are calculated in order to avoid excessive disk I/O writes and disk space consumption.

In the event that none of the parameters exceed the respective maximum value, the query is allowed to proceed at 120. However, if any of the parameters are exceeded, then the query is delayed or aborted at 122.

Example Pseudo code for a dispatcher's execution of a product join is set out below.

---

If left input is a spool file
   #left_rows = actual row count recorded by prior populating step
Else
   #left_rows = Optimizer's estimate in execution plan
If right input is a spool file
   #right_rows = actual row count recorded by prior populating step -continued

```
Else
    #right_rows = Optimizer's estimate in execution plan
    cross_product = #left_rows * #right_rows
    If a WHERE clause join_condition specified
        #output_rows = optimizer_estimate(#left_rows, #right_rows,
join_condition)
    Else
        #output_rows = cross_product
    output_row_size = summation of all column sizes (in bytes) appearing
in output spool file
    output_space = #output_rows * output_row_size
    If ( cross_product <= workload_rule_max_cross_product AND
      #output_rows <= workload_rule_max_output_rows    AND
      output_space <= workload_rule_max_output_space)
        Proceed with normal step execution
    Else
        Stop/abort the execution of the query
        If user defined rule action is 'Abort'
            Issue error message to end user
        Else if user defined rule action is 'Delay'
            Place query in time delayed queue
            Issue informational message to end user
```

This algorithm executes within the context of the dispatcher when it encounters a step involving a product join. It is noted that the user can optionally choose to enforce such workload management prior to the query activation as well, in which case the algorithm executed by the dispatcher serves as an additional reinforcement.

It is important to note that where inputs are spool files, then it is possible then to accurately know the row count and then in turn provide a more accurate estimate of the resource cost of performing the query.

The present invention provides an improved accuracy in identifying resource intensive product joins. There is little or no overhead required to perform rule execution at run-time. The process is easily implemented with an existing execution architecture. The invention is also able to co-exist with workload management tools applied prior to query execution.

The present invention enforces a workload management rule for product joins after the input tables have been populated but prior to the execution of the join operation. Delaying enforcement to this point ensures that the sizes of the inputs and outputs are reliably known but is still early enough to prevent any serious performance degradation from an inefficient product join.

It will be understood to persons skilled in the art of the invention that many modifications may be made without departing from the spirit and scope of the invention.

The invention claimed is:

1. A database system workload management method comprising: providing populated input tables of a database query;
   calculating one or more parameters reflective of resource requirements of the query, wherein the resource requirements of the query are based on the populated input tables;
   determining whether the one or more of the parameters exceed a respective specified parameter maximum value; and
   in the event that the one or more parameters do not exceed the respective maximum value proceeding with execution of the query.

2. A method as claimed in claim 1, wherein the query involves a product join.

3. A method as claimed in claim 1, wherein in the event that the one or more parameters exceed the respective maximum value, execution of the query is stopped or delayed.

4. A method as claimed in claim 1, wherein the one or more parameters are derived from a number of rows of the input tables.

5. A method as claimed in claim 1, wherein one or more of the input tables is a spool file, in which a number of rows is obtained from a count recorded by the population of the spool file.

6. A method as claimed in claim 1, wherein one or more of the input tables is a base table.

7. A method as claimed in claim 1, wherein a number of rows of the input tables is obtained from an optimizer's estimate in an execution plan.

8. A method as claimed in claim 1, wherein one of the parameters is a cross product of a number of rows of each input table.

9. A method as claimed in claim 1, wherein one of the parameters is a number of output rows.

10. A method as claimed in claim 9, wherein the number of output rows is determined by an actual number of input rows.

11. A method as claimed in claim 9, wherein the number of output rows is an estimate by the optimizer.

12. A method as claimed in claim 1, wherein In an embodiment, one of the parameters is an output size of a table resulting from the query.

13. A method as claimed in claim 12, wherein the output size is determined by an actual size of the table resulting from the query.

14. A method as claimed in claim 12, wherein the output size is an estimate.

15. A method as claimed in claim 1, wherein the parameter is partly based on an actual size of the input table.

16. A database system for performing a query based on populated input tables comprising:
   at least one storage device that stores a database and a source of instructions; and
   at least one processor that calculates one or more parameters reflective of resource requirements of the query, wherein the resource requirements of the query are based on the populated input tables and determines whether the one or more of the parameters exceed a respective specified parameter maximum value; and in the event that the one or more parameters do not exceed the respective maximum value the at least one processor is arranged to cause execution of the query to proceed.

17. A database product computer program tangibly embodied on a computer-readable medium comprising instructions for causing a computer processor to:
   calculate one or more parameters reflective of resource requirements of a database query, wherein the resource requirements of the query are based on populated input tables of the database query;
   determine whether the one or more of the parameters exceed a respective specified parameter maximum value; and
   proceed with execution of the query in the event that the one or more parameters do not exceed the respective maximum value.

* * * * *